Oct. 13, 1953     R. G. LE TOURNEAU     2,655,089
EARTH WORKING TOOL
Filed May 27, 1949     2 Sheets-Sheet 1
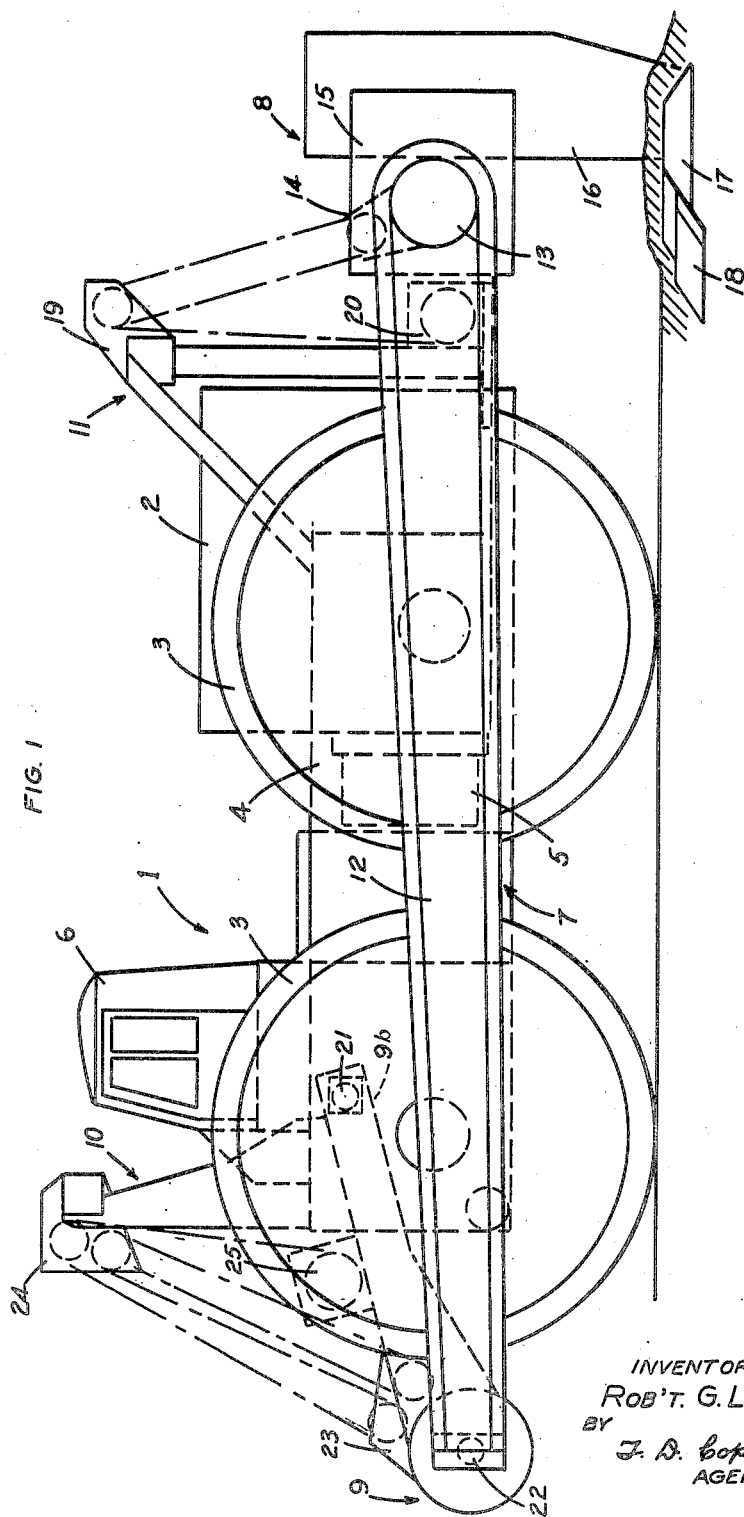
INVENTOR:
ROB'T. G. LETOURNEAU
BY
F. D. Copeland
AGENT

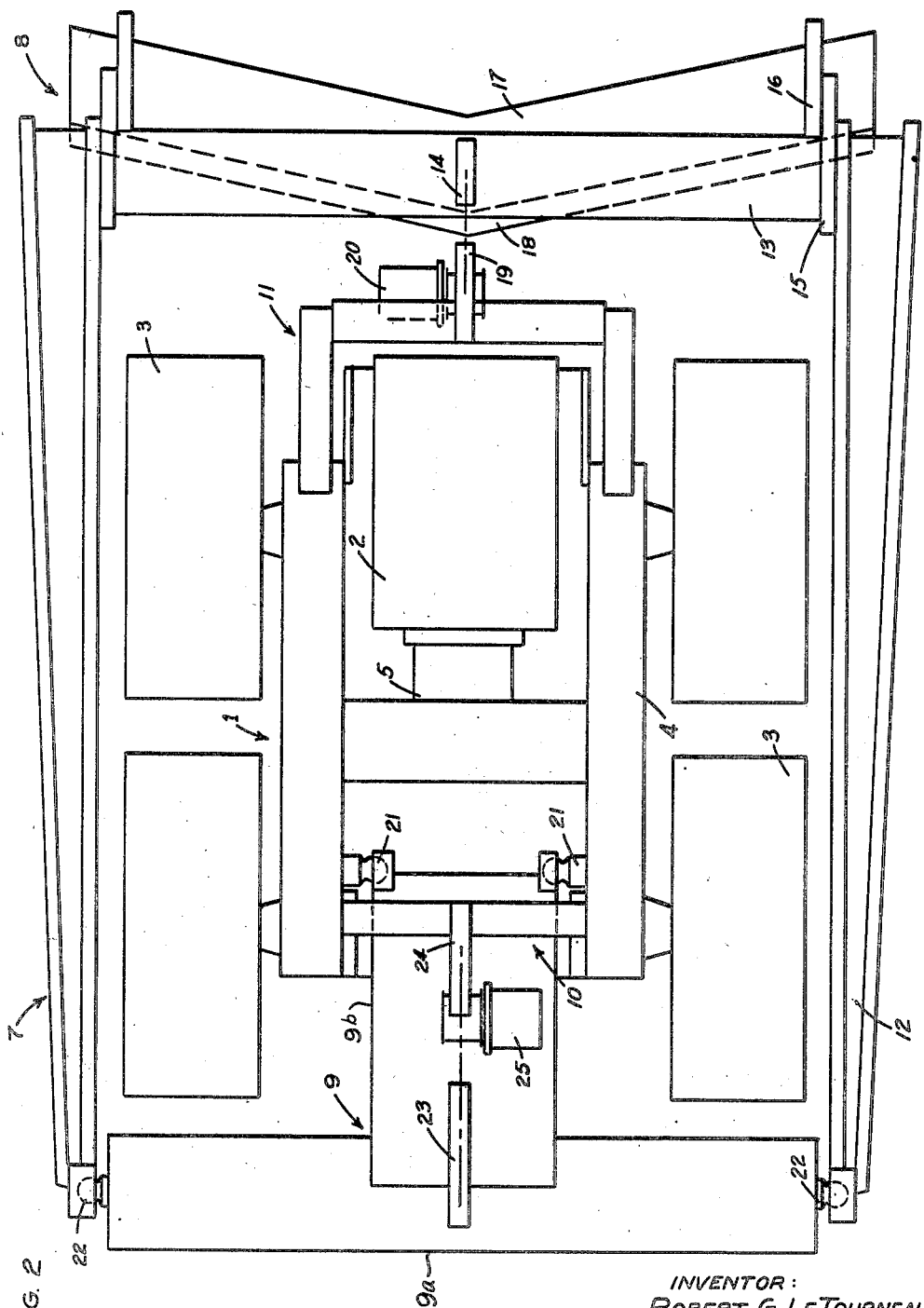

Patented Oct. 13, 1953

2,655,089

UNITED STATES PATENT OFFICE 2,655,089

EARTH WORKING TOOL

Robert G. Le Tourneau, Longview, Tex., assignor to R. G. Le Tourneau, Inc., Longview, Tex., and Peoria, Ill., a corporation of California Application May 27, 1949, Serial No. 95,632

3 Claims. (Cl. 97—226.1)

This invention is directed to, and it is the main object to provide, an improved adjustment means, especially suited, but not limited, to root cutting devices carried on heavy duty tractors.

Another object of the invention is to provide an adjustment mechanism which is selectively power-operated from controls in the operator's cockpit.

An additional object of the invention is to provide an adjustment mechanism for an agricultural or earth working tool which is power-operated by the same means as that employed to raise or lower the tool, i. e., cable control system; this feature will reduce the number of parts required for maintenance, etc.

A still further object is to provide an adjustment means located at the front of the tractor for controlling the pitch of a blade suspended from the rear. This will allow the operator to know from observation the approximate pitch of the blade even though the blade is buried in the ground.

Another object is to provide in this combination a blade mount which is trapezoidal in cross section, so that when the blade is adjusted to its normal digging angle, this mount causes the earth to rise without eruption and pass over the blade mount and lay back in the same relative position it occupied before the cut.

A further object is to provide a practical, reliable, heavy duty root cutting mechanism, and yet one which will be exceedingly effective for the purpose for which it is designed.

These objects are accomplished by means of such structure and relative arrangement of parts as will fully appear by a perusal of the following specification and claims:

In the drawings:

Fig. 1 is a side elevation of a tractor embodying the invention. The root cutting blade here being under ground in normal operating position.

Fig. 2 is a top plan view thereof but with the blade out of the ground, and with the cab removed.

Referring now more particularly to the characters of reference on the drawings, this root cutting mechanism is suspended and adjustably attached to heavy duty tractor 1 powered by an engine 2 and propelled along the ground by large steel wheels 3. The tractor itself is composed of a rigid case 4 which supports a cab 6 and an engine 2 which drives an in-line generator 5 the rotor of which in turn is connected to and drives a transmission input shaft and through driving connections ultimately supplies power to the wheels 3. A tractor of this type may be more carefully observed in my co-pending application #727,804, filed February 11, 1947.

The invention at hand consists of the root cutting mechanism which is employed on this tractor. This mechanism includes a frame comprising a yoke indicated generally at 7 and a blade support indicated at 8, and a support structure indicated at 9; this mechanism is suspended from the tractor by means of front and rear A-frames 10 and 11. Examining the yoke 7 it is seen to consist of side arms or plowbeams 12 and tubular cross beam 13 which contains sheave housing 14 at its mid-section. Blade support 8 includes plates 15, one of which is bolted to the yoke 7 between cross beam 13 and side arms 12 at each side. Each plate 15 extends rearwardly to receive a vertical support 16 which depends to connect to a V-shaped blade mount 17 including removable blades 18.

It will be readily observed from Figure 1 that side arms or plowbeams 12 are pivotally mounted forward of the tractor body while blade support 8 and blades 18 are mounted rearwardly of the tractor body. Use of a long side arm construction has been found to give better penetration of the blades in the earth since there is a flatter angle of draft. Thus the hinged mounting of the side arms forward of the tractor accomplishes new and useful results and results in an improved implement which could not otherwise be achieved with so compact and close coupled an arrangement.

Sheave housing 14, together with sheave housing 19 and reversible electric winch 20, make up a power operated cable control system for raising or lowering the rear end of yoke 7 and consequently the blade 18.

At the front of tractor 1, the T-shaped supporting structure has an arm 9b pivoted to tractor case 4 by means of ball and socket connections 21. The support structure 9 is also pivoted to yoke 7 by means of ball and socket connections 22 which join crosspiece 9a of the T with the forward ends of side arms 12. A sheave housing 23 is mounted on arm 9b and is operatively connected with sheaves of housing 24 mounted centrally of front A-frame 10 and with reversible electric winch 25.

Generator 5 being driven by engine 2 supplies sufficient electrical power to operate both winch units 20 and 25 simultaneously if desired through electric control switches mounted in cab 6 at convenient reach of the operator.

Operation

When the operator moves the blade hoist switch to an "up" position, electric winch 20 rotates in a direction to reel in cable and the rear end of yoke 7 moves up in an arc about pivot 22. In actual practice, due to the long radius of side arms 12, this movement is substantially vertical over most of the operating range. When the operator moves this switch to the "down" position, the electric winch reverses and pays out cable to permit the blade and yoke to lower under their own weight.

When it is desirable to change the pitch or "bite" of blade 18, the operator moves the adjustment switch up which causes winch 25 to reel in cable and raise support structure 9 in an arc about its pivot 21. Since the structure 9 is pivoted to yoke 7, the latter rises in the same arc at this point. This movement is transmitted to and causes an upward tilt of blade 18. When the adjustment switch is moved to the "down" position structure 9 lowers and the reverse tilting of blade 18 is accomplished.

From the foregoing description it will be readily seen that there has been produced such a device as substantially fulfills the objects of the invention as set forth herein. It is to be understood that while this invention has been described as embodied in a root cutting mechanism, it may be embodied in other earth working tools as well.

While the specification sets forth in detail the present and preferred construction of this mechanism, still in practice such deviations from such detail may be resorted to as do not form a departure from the spirit of the invention as defined by the appended claims.

Having thus described the invention, the following is claimed as new and useful and upon which Letters Patent are desired:

1. An earth working tool comprising: a tractor; an arm pivotally mounted on said tractor and extending forwardly therefrom for movement in a vertical plane; a crosspiece carried by said arm and extending transversely of said tractor and spaced forwardly from the front end thereof; a yoke having arms extending along the sides of said tractor; a pivotal connection between each of said yoke arms and said crosspiece; a blade supported by said yoke and extending transversely of said tractor, said blade being disposed rearwardly of said tractor; power means operable to rotate said yoke arms about said pivotal connection to raise and lower said blade and power means operable to rotate said arm about its pivotal mount on the tractor and thereby raise or lower the crosspiece to vary the pitch of said blade.

2. An earth working tool comprising a tractor, a supporting structure forwardly extending from the tractor, and including an arm pivotally mounted on the tractor and a crosspiece carried by the arm, a pair of rigid frame plowbeams, one on each side of the tractor and each hinged to the crosspiece at a position forward of the tractor, an earth working implement carried by said plowbeams rearwardly of said tractor, and raising and lowering means for the supporting structure whereby the angle of draft of said implement can be controlled.

3. An earth working tool comprising a tractor; a supporting structure including a crosspiece disposed forwardly of the tractor and a longitudinal arm extending rearwardly from the crosspiece and pivoted at its free end to the tractor; a pair of rigid frame plowbeams, one on each side of the tractor and each hinged to the crosspiece at a position forward of the tractor; and an earth working implement carried by said plowbeams rearwardly of said tractor; whereby upon imparting a lifting force to the crosspiece the arm will pivot on its support and permit the crosspiece to be raised or lowered to control the angle of draft of said implement.

ROBERT G. LE TOURNEAU.

References Cited in the file of this patent

UNITED STATES PATENTS

| Number | Name | Date |
|---|---|---|
| 418,819 | Ranney | Aug. 30, 1892 |
| 1,765,746 | Stubenberg | June 24, 1930 |
| 1,974,520 | Stewart | Sept. 25, 1934 |
| 2,151,270 | Hamill | Mar. 21, 1939 |
| 2,185,179 | Bird et al. | Jan. 2, 1940 |
| 2,190,347 | Austin | Feb. 13, 1940 |
| 2,292,904 | Shollenberger | Aug. 11, 1942 |
| 2,322,256 | Rubens | June 22, 1943 |
| 2,339,830 | Zink et al. | Jan. 25, 1944 |
| 2,429,463 | Hurlimann | Oct. 21, 1947 |